United States Patent [19]

Heger et al.

[11] Patent Number: 4,505,648

[45] Date of Patent: Mar. 19, 1985

[54] UNLOADING MECHANISMS FOR AIR COMPRESSORS

[75] Inventors: Werner Heger, Lehrte-Kolshorn; Wolfgang Kaltenthaler; Helmut Wilke, both of Wennigsen, all of Fed. Rep. of Germany

[73] Assignee: WABCO Fahrzeugbremsen GmbH, Hanover, Fed. Rep. of Germany

[21] Appl. No.: 416,831

[22] Filed: Sep. 13, 1982

[30] Foreign Application Priority Data

Sep. 17, 1981 [DE] Fed. Rep. of Germany ....... 3136948

[51] Int. Cl.³ ............................................. F04B 49/02
[52] U.S. Cl. .................................... 417/297; 417/307
[58] Field of Search ................ 417/297, 307, 311, 296

[56] References Cited

U.S. PATENT DOCUMENTS 3,255,954 6/1966 Norlin et al. ...................... 417/311

FOREIGN PATENT DOCUMENTS 2615627 10/1976 Fed. Rep. of Germany ...... 417/297

Primary Examiner—Richard E. Gluck
Attorney, Agent, or Firm—J. B. Sotak

[57] ABSTRACT

A pressure gas generating system including the compressor which is switched to a no-load condition when a predetermined pressure level is reached. The system employs either a regulator or a governor to allow the free exchange of gas between the suction chamber and the compression chamber to prevent the development of high temperatures. In the pressure regulator control system, the opening of the discharge valve is enlarged and is vented into the atmosphere by the pressure regulator so that the compressor continues to operate with reduced drive power and generates less heat during the no-load condition. In the pressure control system, the pressure discharge valve as well as the suction valve are opened during the no-load condition.

4 Claims, 4 Drawing Figures

UNLOADING MECHANISMS FOR AIR COMPRESSORS

FIELD OF THE INVENTION

The invention relates to mechanisms for generating pressure gas for compressed air brake systems and more particularly to an unloading arrangement for air compressors which causes a pressure regulating mechanism to enlarge and open the discharge pressure valve and/or to open the discharge pressure valve and suction valve to control the air pressure in an air supply system.

BACKGROUND OF THE INVENTION

A certain air pressure control mechanism relating to a compressed air brake system is shown and disclosed in instruction and service data literature SD-36 REV. 7/18/68 by Bendix-Westinghouse. In this particular system a switch or change-over valve, which is also known as a governor, was located in the pressure line. The pneumatic control outlet of the governor is connected with the pneumatic control connection of the compressor for the purpose of opening the suction valve to establish the unloading phase of the compressor.

During the unloading phase, the air pressure of the consumer is supplied to the control connection of the compressor which acts upon a piston to open the suction valve.

With this cutting-off technique, the pressure generating power of the compressor is largely eliminated because the suction valve is kept open during the unloading or idling phase of the compressor. However, relatively high temperatures can result due to the fact that no exchange of air takes place, and since the piston is still moving the hot air is pumped back and forth between the suction and compression chambers to further increase heating even more. Since there is no existing exchange of the air which is moving back and forth, this leads to a relatively long lag time in which unwanted oil is pumped from the crankcase into the suction and compression chambers which subsequently leads to oil carbon formation.

OBJECTS OF THE INVENTION

Therefore, it is an object of this invention to provide a new and improved mechanism of the aforementioned type, whereby in the unloading phase a significant pressure relief is achieved in the discharge line in a simple manner and without the above-noted disadvantages.

A further object of this invention is to provide a mechanism for generating compressed air for vehicle air brakes comprising, a compressor having a compression chamber which takes in the gas that is to be compressed and exhibits a pressure gas outlet, the compression chamber of the compressor is connected with the pressure gas outlet via a pressure discharge valve, the pressure gas outlet is connected via a pressure line with a consumer which is designed as a storage tank, a pressure regulating system switches the compressor from a compression phase to an unloading phase when a certain predetermined pressure is reached, the compressor is equipped with a first pneumatic control connection for opening the pressure discharge valve and for an associated means which reduces the work load on the compressor with respect to temperature during the unloading phase, and the first pneumatic control connection of the compressor is connected with a pneumatic control outlet of the pressure regulating system.

A further advantage of the present invention exists inasmuch as complete relief of the pressure discharge valve is achieved during the unloading phase. It will be appreciated that, during the unloading phase, the pressure head at the pressure discharge valve is reduced considerably so that smaller work loads are experienced with respect to the operating temperature. Thus, the lifespan of a pressure discharge valve is prolonged considerably because of its not functioning during the unloading phase.

DESCRIPTION OF THE DRAWINGS

The invention is explained in more detail on operating examples which are represented in the drawings.

DETAILED DESCRIPTION OF THE INVENTION

Figure 1:
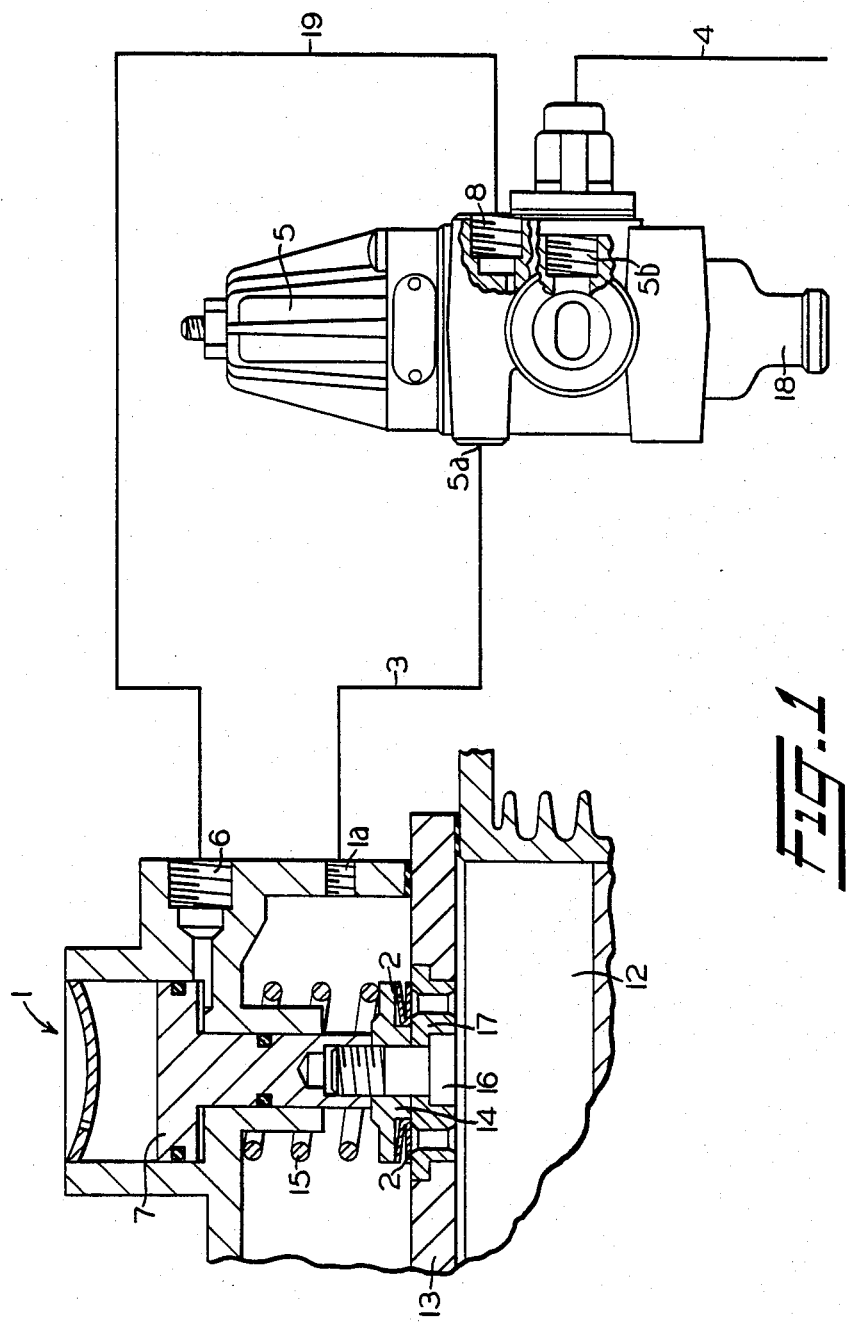
FIG. 1 shows a partial view of a compressed air generating mechanism with a pressure regulator whose control outlet is connected with the control connection of the compressor for the purpose of opening the pressure discharge valve.
Figure 2:
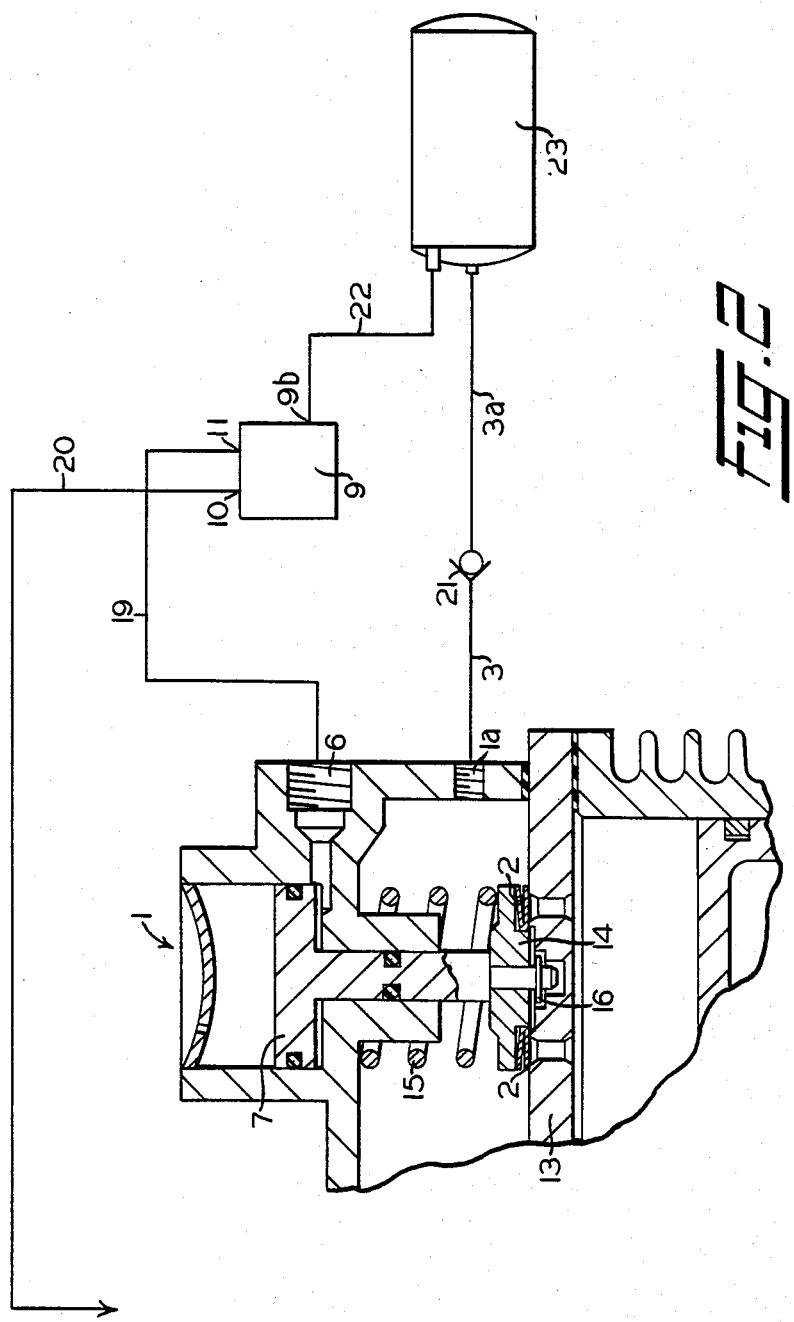
FIG. 2 shows a partial view as per FIG. 1, but with governor pressure regulation, whereby the governor exhibits two control outlets for the purpose of opening the pressure discharge as well as the suction valve.

Referring to the drawings, and in particular to FIGS. 1 and 2, it will be seen that both of the compressed air generating mechanisms consist of a compressor 1 and a pressure regulator 5. As shown in FIG. 1, the compressor 1 has a connection 1a which serves as a compressed air outlet. The outlet 1a is connected by way of a pressure line 3 to a pressure regulator 5 via its inlet connection 5a. An outlet connection 5b of the pressure regulator 5 is connected by a pressure line 4 which leads to the compressed air consumer which, for example, is designed as a storage tank. The pressure regulator 5 includes an opening 18 for venting into the atmosphere.

As shown, the compressor 1 includes a pneumatic control connection 6. Thus, a piston 7 can be acted upon by the compressed air of the consumer which is supplied via a control line 19 and a first control outlet 8 of the pressure regulator 5. In this manner, a connection between this control line 19 and the compressed air system of the consumer is created during the no-load phase of the compressor. In FIG. 1, the connection is established by regulator 5 with pressure line 4.

The piston 7 cooperates with the pressure discharge valve 2 of the compressor 1. The valve 2 is connected between the compression chamber 12 of the compressor 1 and the pressure connection 1a. When the piston is in its switching position, as a result of the force with compressed air, the pressure discharge valve 2 is opened.

As shown, the pressure discharge valve disk 2 of the pressure discharge valve is disposed between a valve support plate 13 and a valve catcher 14. Further, the piston 7 is connected with a valve catcher 14 which is equipped with a gripper 16 which is below the pressure discharge valve disk 2 to allow the pressure discharge valve disk 2 to be lifted from its closed seat on the valve support plate 13 during the upward movement of the piston 7 and valve catcher 14.

In describing the operation of the mechanism of FIG. 1, it will be seen that during the upward movement of the piston 7 the pressure discharge valve disk 2 is lifted. Thus, the pressure discharge valve bore is opened, and at the same time a part 17 which is a part of the valve support plate 13 that supports the pressure discharge valve disk 2 is also lifted. In this way a larger opening is formed. That is, the opening located adjacent the valve opening released by the pressure discharge valve disk 2 is also opened.

Referring now to FIG. 2, it will be seen that a governor 9 is connected with a second pneumatic control device (not shown) of the compressor 1 via a second control outlet 10 and a control line 20. This second device serves the purpose of opening the associated suction valve. Further, it is understood that the two pneumatic control outlets 10, 11 can be combined to form a common control outlet of the governor 9.

Figure 3:
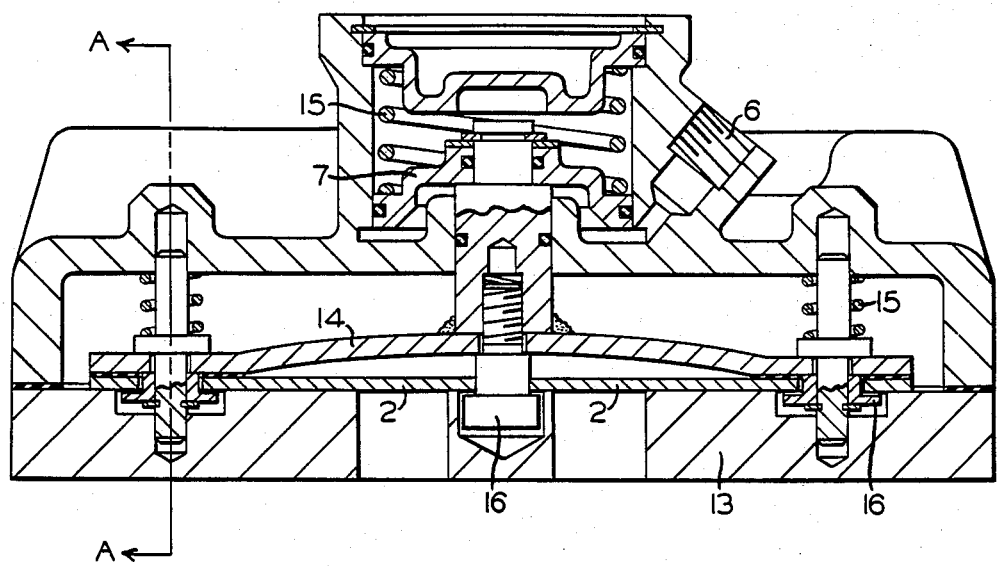
FIGS. 3 and 4 show an additional operating example regarding the means for opening the pressure discharge valve.
Figure 4:
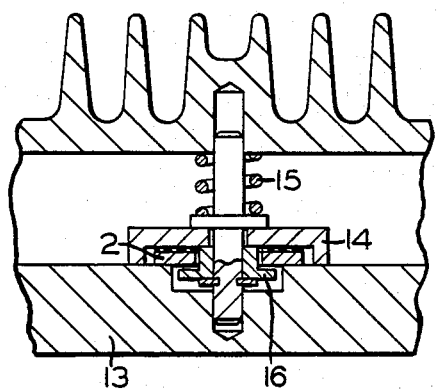

Referring now to FIGS. 3 and 4, it will be seen that the connection between the valve catcher 14 and the gripper 16 which is located below the pressure disk 2 can be disposed at the ends of the valve body 14 and the pressure disk 2. Thus, the connection may be located at the ends rather than in the middle and directly below the piston 7.

The force of the compression spring 15, located above the piston 7 and resting against the cylinder head housing, is designed in such a way that the valve catcher 14 cannot be moved by the pressure of the compressed air during the compression phase.

The function of the compressed air generating mechanism is as follows.

Turning now to FIG. 1, it will be seen that the compressed air generated by the air compressor 1 is conveyed to the pressure connection 1a and in turn to the pressure line 3 which feeds connection 5a of the pressure regulator 5. The compressed air flows and reaches the pressure line 4 via connection 5b of regulator 5 which in turn leads to the consumer such as a storage tank. Similarly, in FIG. 2, the compressed air is fed via the pressure connection 1a into the pressure line 3 and then through pressure line 3a directly into the storage tank 23. Upon reaching the maximum pressure head which is preadjusted to a predetermined level, the pressure regulator 5 switches to a condition in which the pressure line 4 becomes connected to the first control outlet connection 8 and the pressure line 3 becomes vented into the atmosphere via the opening 18. Similarly, upon reaching a predetermined maximum pressure head, the governor 9 switches to a condition in which the compressed air container 23 is connected with the first control outlet 11 via line 22 and the control inlet 9b.

In viewing FIG. 1, it will be seen that an associate part 17 which is disposed in valve support plate 13 is connected to the gripper 16 which is also lifted by the position 7 so that the sectional area of the pressure discharge valve bore is enlarged considerably. The pressure head at the pressure discharge valve rapidly decreases due to this enlargement of the discharge bore.

Now, when the pressure drops to a predetermined minimum value due to the lack of compressed air consumption by the consumer, the pressure regulator 5 of FIG. 1 or the governor 9 of FIG. 2 will reverse and again switch to compression operation. When using the governor 5, the pressure line 3 is not vented into the atmosphere. In this case, the pressure discharge valve is opened and is put out of operation so that the pressure chamber of the compressor and the output storage tank are connected with the compression chamber of the compressor via a check valve 21 during both the suction and compression stroke. This is effectively the actual volumetric capacity which brings about pressure stabilization of the compressor at a low pressure level and means the compression of the compressor is discontinued.

Another advantage of the mechanism in accordance with the invention which is worth mentioning is the fact that the blowoff noise of the pressure regulator venting into the atmosphere is effectively reduced due to the simultaneous switching of the pressure discharge valve to an open position.

The embodiment shown in FIG. 2 illustrates an optimum solution to the problem advanced by the present invention. As shown, the pressure regulation is accomplished by means of a governor 5 which opens the suction valve and which simultaneously opens the pressure discharge valve so that further reduction of the pressure head is achieved in the open position of the pressure discharge valves.

The same effect may be achieved if, in addition to the pressure regulator for tripping the pressure discharge valve, a governor is employed for tripping the suction valve.

Under the above-mentioned arrangement, the control outlet 10 of the governor 9 may be omitted if the pressure valve is exclusively in an open position.

It will be appreciated that the pressure disk of the pressure discharge valve can be replaced by a small metal plate which is made of flexible material. It will be seen that FIGS. 3 and 4 illustrate a flexible pressure disk.

We claim:

1. A mechanism for generation of pressure gas for a compressed air brake system comprising, a compressor having a compression chamber which takes in the gas that is to be compressed and exhibits a pressure gas outlet, the compression chamber of the compressor is connected with the pressure gas outlet via a pressure discharge valve, the pressure gas outlet is connected via a pressure line with a consumer which is designed as a storage tank, a pressure regulating system which switches the compressor from a compression phase to an unloading phase when a certain predetermined pressure is reached, the compressor is equipped with a first pneumatic control connection for opening the pressure discharge valve and for opening means associated with the pressure discharge valve to reduce the pressure head on the compressor during the unloading phase, and the first pneumatic control connection of the compressor is connected with a pneumatic control outlet of the pressure regulating system an operating piston is provided in the compressor for the opening of the pressure discharge valve, said piston is operated by the pressure which is supplied to the first pneumatic control connection, the pressure discharge valve includes a pressure disk that is arranged between a valve support plate and a valve catcher, the valve catcher serves the purpose of supporting the pressure disk against the forces that are a result of the compressed gas acting upon the pressure disk, the operating piston is connected to the valve catcher so that during the unloading phase the valve catcher can be moved away from the valve support plate against the force of a spring, and the force of the spring is sufficient to prevent movement of the valve catcher by the pressure of the compressed gas during the compression phase, and the valve support plate includes a part for supporting the pressure disk and is movable toward the open direction of the pressure disk so that a larger opening is formed during the unloading phase, and the operating piston is adapted to move the movable part relative to the valve support plate.

2. The mechanism as defined in claim 1, wherein the pneumatic control outlet of the pressure regulating system is connected with the pressure gas system of the consumer when the compressor is in the unloading phase.

3. The mechanism as defined in claim 2, wherein the pressure regulating system includes a pressure regulator having an opening connected to atmosphere for venting the pressure line connected with the consumer, the pressure regulator is inserted into the pressure line which leads to the consumer, and further the pressure regulator connects the consumer with the first pneumatic control connection of the compressor to the pneumatic control outlet when the pressure regulated is vented to atmosphere.

4. The mechanism as defined in claim 1, wherein the valve catcher includes a gripper which causes the lifting of the pressure disk from the valve support plate during the unloading phase.

* * * * *